April 13, 1954

J. P. NEWMAN 2,674,875

HARDNESS TESTER

Filed Feb. 9, 1950

INVENTOR.
JOHN P. NEWMAN
BY
Lyon & Lyon
ATTORNEYS

April 13, 1954

J. P. NEWMAN 2,674,875

HARDNESS TESTER

Filed Feb. 9, 1950

INVENTOR.
JOHN P. NEWMAN
BY Lyon+Lyon
ATTORNEYS

Patented Apr. 13, 1954

2,674,875

UNITED STATES PATENT OFFICE 2,674,875

HARDNESS TESTER

John P. Newman, Los Angeles, Calif.

Application February 9, 1950, Serial No. 143,248

9 Claims. (Cl. 73—83)

This invention relates to hardness testing machines and has particular reference to a hardness tester of the Rockwell type.

The principal object of this invention is to provide a novel hardness testing machine.

Another object of my invention is to provide a novel hardness testing machine which is simple to operate and which will give accurate and reliable results.

Another object of my invention is to provide a hardness tester which is light in weight, easily portable and inexpensive to manufacture, yet which is sufficiently rugged and durable to be used in the shop or plant proper as well as in the laboratory.

Another object of my invention is to provide a hardness tester having novel load-applying means.

A further object of my invention is to provide a hardness tester in which errors due to friction are reduced to a minimum.

Other objects and advantages it is believed will be apparent from the following detailed description when read in connection with the accompanying drawings.

In the drawings:

Figure 3 is a sectional elevation taken substantially on the line 3—3 of Figure 2.

Figure 4 is a sectional elevation taken substantially on the line 4—4 of Figure 2.

Figure 7 is a sectional elevation taken substantially on the line 7—7 of Figure 4.

Figure 1:
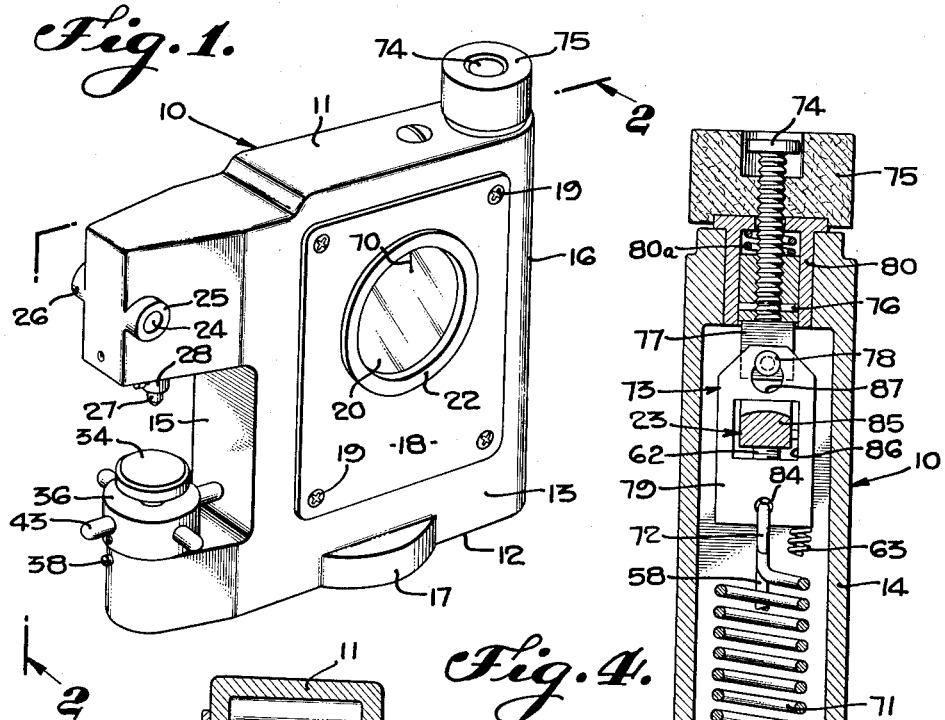
Figure 1 is a perspective view of a preferred embodiment of my invention.

Hardness testing machines or instruments of the Rockwell type operate by measurement of the depth of penetration of a steel ball or diamond point on the material to be tested upon the application of a predetermined load. In order to eliminate possible errors due to original surface irregularities of the specimen and to deformation around the indentation at the specimen surface, an initial or "minor" load is applied through the penetrator before the heavier "major" load is applied. The reading of the instrument is then a measure of the increment in penetration due to the increased load. The machine which embodies my invention is similar to conventional hardness testing machines in that this method of measurement of increment of penetration is used. The instrument embodying my invention differs principally from commercially available types in the means for applying the loads, the manner in which the loads are applied, and in the means by which the penetration is measured and indicated on the dial.

Referring now to the drawings, the testing machine embodying my invention includes a frame or housing generally designated 10, preferably a casting having top and bottom walls 11 and 12, front and rear walls 13 and 14, and end portions 15 and 16, respectively. A pair of rounded foot members 17 may be formed on the lower portion of the housing to provide a steady base for the machine. Access to the working parts in the interior of the housing 10 is provided by the cover plate 18 which is secured to the front wall 13 by means of screws 19. A glass port 20, through which the dial gauge 21 (described more fully below) is observed, is secured to the cover plate 18 by means of a retaining ring 22.

A power lever or beam 23 is operably connected to the housing 10 by means of a pin 24 which is secured to the front wall and back wall in bosses 25 and 26. The penetrator 27 which may be a steel spherical member or a diamond point, depending upon the hardness range of the material to be tested, is carried in a plunger 28 which is mounted in the housing 10. Set screw 29 is provided so that the penetrator 27 may be secured to the plunger 28. Limited vertical movement of the plunger 28 with respect to the housing 10 is permitted by the slot 30 through which is inserted a pin 31. The upper end 32 of the plunger which may be rounded, as shown, contacts the power beam 23 adjacent the pivot pin 24. The beam may be recessed as at 33 to provide for the reception of the plunger.

Means are provided for supporting a specimen 9 and for forcing the penetrator into the specimen to apply the minor load. As shown in the drawings, this means may include the anvil 34 which is carried on an elevating screw 35. The screw 35 is threadedly engaged in the nut 36 and slidably engaged in the bushing 37 which is secured to the housing 10 by means of holding screw 38 extending through an aperture 39 in the wall of the bushing 37. Disassembly of the nut from the housing is prevented by means of holding screw 40 which extends through the nut into a peripheral groove 41 in the upper portion of the bushing 37. Rotary motion of the elevating screw 35 is restricted by means of the holding screw 38 which extends into a vertical groove 42 in the elevating screw. Handles 43 may be provided on the nut 36 to facilitate the turning of the nut.

Means are provided to measure and indicate the penetration of the penetrator 27 into the specimen. The extent of this penetration is directly proportional to the displacement of the power beam 23 when it is actuated by the power means described below.

The indicating dial 21 is carried on a pinion 45 journaled on the shaft 46, which shaft is in turn journaled in bushing 47. The bushing 47, preferably of non-metallic material, is maintained in adapter 48 which is threadedly secured to the back wall 14 of the housing. The dial is driven, through the pinion 45, by means of rack 49. It will be noted that in the drawings the rack 49 is curved and therefore might be considered to be a segment of a gear. However, while such curved rack or gear segment is preferred, the rack may in fact be straight if desired, and therefore I choose to term the member 49 a rack rather than a gear segment.

The rack 49 is pivotally connected, through pin 50, to the long leg 51 of bell crank 52. The crank 52 is pivotally supported in the housing 10 by means of the pivot pin 53, the ends of which are conical in shape and maintained in conical apertures 54 and 55 in holding members 56 and 57, respectively, so that free rotational motion of the pin 53 is afforded. The bell crank 52 is actuated by a push rod 58 which extends from the short leg 59 of the bell crank to the power beam 23. Pivotal motion of the push rod 58 is permitted by a construction similar to that of the pivot pin 53 in that the ends of the rod 58 are pointed to be received into conical aperture 60 in the short leg 59 and aperture 61 in the screw member 62 which is threadedly engaged with the power beam 23. It will be noted that this arrangement provides, in effect, universal connections between the push rod and the bell crank and between the push rod and the beam. A coil spring 63 is provided between the beam 23 and the bell crank 52 to prevent disassembly of the push rod 58.

From the above description it will be understood that the penetration of the member 27 into the specimen will be reflected in vertical motion of the power beam 23, and this vertical motion will be translated into circular motion of the dial 21 by means of the push rod 58 acting upon the bell crank 52, which in turn causes the rack 49 to be moved to rotate the pinion 45.

Means are provided to reduce the friction between the rack 49 and the pinion 45 which is meshed therein, and as shown in the drawings this means may include a preferably non-metallic, grooved guide bar 64 mounted above the pinion, and coil spring 65 which connects the end 66 of the rack to the long leg 51 of the bell crank through a hook member 67. This arrangement provides means for lifting the rack 49 away from the pinion 45, disengagement being prevented by the non-metallic member 64. I have found that excessive friction is thus reduced since the coefficient of friction between the non-metallic member 64 and the back side of the rack 49 is considerably less than that between the teeth of the rack and of the pinion.

A crank member 68 is adjustably secured to the housing 10 through threaded element 69 and provides a stop means for the leg 51. By rotation of this crank 68 the dial 21 may be initially set to read zero. A vertical mark 70 is provided on the glass port 20 for indicating the readings on the dial 21.

Conventional hardness testing instruments employ dead weights to supply the force for penetrating the specimen to be tested. The use of such weights requires complicated mechanisms for selectively applying the weights, as well as for providing means for non-instantaneous application of the force. It is necessary, of course, that the penetrator be forced into the specimen slowly so as to avoid errors due to impact, and also to avoid possible breakage or deforming of the penetrator. I have found that a much simpler mechanism may be used by employing a load or coil spring 71 under tension as the force-producing means. Furthermore, by the use of a coil spring rather than a series of dead weights, selective application of the force to the power beam may be accomplished merely by increasing or decreasing the tension in the spring.

The lower portion of the coil spring 71 is anchored to the casing 10 by means described below, the upper portion of the spring being formed into a hook member 72 for connection with the load applying unit generally designated 73. The load applying unit 73 includes means for applying the load slowly to the beam 23 to avoid excessive impact force on the penetrator 27. These latter means include a lowering screw 74 which is threadedly engaged with a non-metallic knob 75. The screw 74 is secured by means of pin 76 to a connector or coupling element 77 which carries at its lower end a pin member 78 for the suspension of plate 79 described in more detail below. The coupling element 77 is mounted in bushing 80 in vertical slidable relationship therewith, coil spring 80a being provided to maintain the unit 73 firmly in place at all times. Rotation of the screw 74 is prevented by means of holding screw 81 which extends through the end portion 16 of the housing 10 and through an aperture 82 in the bushing 80 into a longitudinal slot 83 in the coupling element 77.

Figure 6:
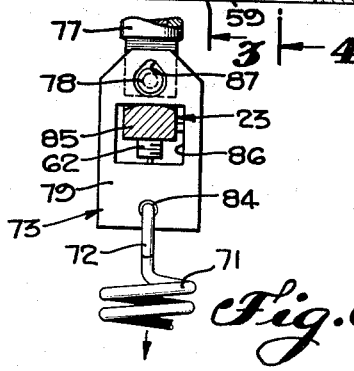
Figure 6 is a detail, partly in section, illustrating the operative position of the load-applying plate.

The hook member 72 of the spring 71 is connected to the plate 79 through an aperture 84. The end portion of the power beam 23 which may be reduced in cross section, as at 85, extends through a central aperture 86 in the plate 79. This aperture 86 is considerably larger than the portion 85 of the beam to permit relative motion between the plate and the beam. The plate 79 is supported on the pin 78 through aperture 87 which is somewhat larger than the diameter of the pin 78. From the above description, it will be understood that the load may be applied to the beam 23 by lowering the plate 79 so that it may rest upon the beam, two lost motion connections being provided, one between the coupling element and plate and the other between the plate and the beam. The plate 79 is lowered by turning the knob 75 in a counterclockwise direction, as viewed in Figure 2. The speed with which the force of the spring 71 is applied to the beam 23 is governed by the rate at which the knob 75 is turned. As the operator continues to turn the knob 75, the pin 78 is disengaged from the plate 79 so that all of the tension in the spring 71 is applied to the power beam 23 (see Figure 6).

Means are provided to initially adjust the tension in the spring 71 so that the desired load may be applied thereby. These means may include screw member 88 which is journaled in block 89 in the bottom wall 12 and threadedly engaged in spring anchor member 90 to which is secured the lower end of the spring 71. The block 89 is held in place against the tension of the spring 71 by means of eccentric member 93 described below. It will be understood that the tension in the spring 71 may be increased or decreased by turning the screw member 88 in one direction or the other. A bar 91 may be provided secured to the block 89 and slidably associated with the anchor member 90 in the vertical channel 92 to prevent rotation of the spring 71 when the screw member is turned.

There are several scales of Rockwell hardness depending upon the particular hardness range of the metal or other material to be tested and upon the type of penetrator to be used. In order to arrive at these values, generally one of two different loads are applied to the penetrator. I have provided means by which either one of two different loads may be caused to be applied by the spring 71 without adjustment of the tension through the operation of the screw member 88. This means may include an eccentric member 93 which extends through the back wall 14 into a depression 94 in the block 89. The eccentric member may comprise a shaft 94a having a head portion 95 and an eccentric portion 96. The head portion 95 may be arcuately grooved as at 97, a screw member 98 being provided in the circular depression 99 to act as a stop as well as preventing disassembly of the eccentric member. With the eccentric in the lowered position shown in the drawings, the greatest degree of tension in the spring 71 may be obtained. In initially calibrating the machine, the desired value of spring tension with the eccentric in this position is obtained by adjusting the screw 88. The machine is then ready for use and the tension in the spring may be rapidly changed from the predetermined high value to the desired low value merely by turning the eccentric 93 to the up position.

Figure 2:
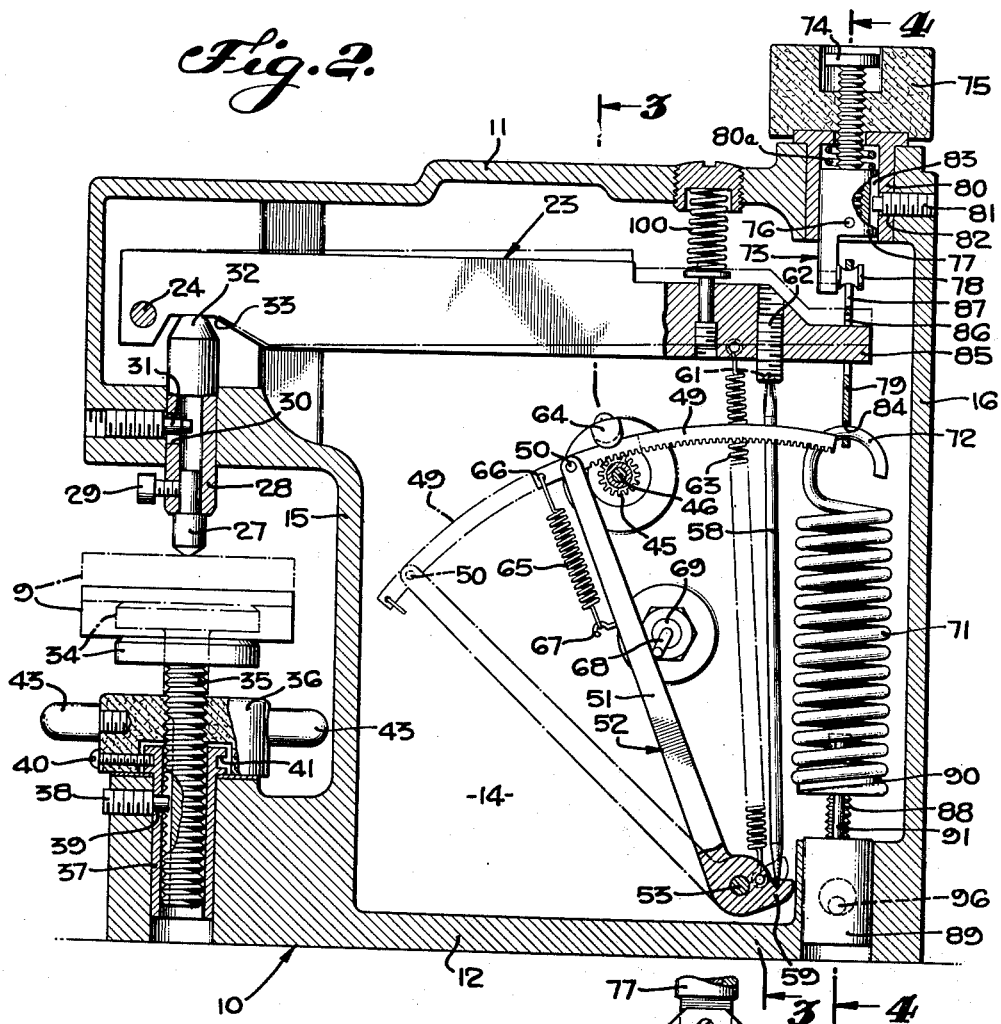
Figure 2 is a sectional elevation taken substantially on the line 2—2 of Figure 1.
Figure 5:
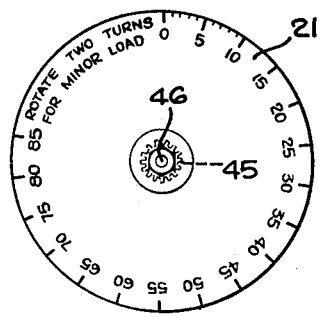
Figure 5 is a front elevation of the dial on which are read the hardness values determined by the machine.

The operation of the machine embodying my invention is as follows:

The load applying unit is set in the position shown in Figure 2, by turning the knob 75, so that there is no load on the beam 23. The dial 21 should now read "zero"; if necessary the crank 68 may be turned to establish that value on the dial. The specimen 9 is placed on the anvil 34 and the nut 36 turned to elevate the specimen and bring it into contact with the penetrator 27. The minor load is applied by continued turning of the nut 36, forcing the penetrator into the specimen while the beam 23 is pivoted upwards against the coil spring 100 which is interposed between the beam and the housing 10. The approved minor load is 10 kilograms and the leverages and strength of the spring 100 are such that this desired load is applied when the dial 21 has gone through two complete revolutions. The phantom lines in Figure 2 illustrate the position of the parts when the minor load is applied.

The major load is now applied by turning the knob 75 so as to slowly drop the plate 79 upon the beam 23 in the manner described above. When the knob is turned sufficiently so that the plate 79 rests freely upon the beam 23, the entire force of the spring 71 is applied to the specimen and the dial gauge 21 will register the hardness of the specimen directly in Rockwell units.

While I have shown and described a specific embodiment of my invention, I do not limit myself to the exact details of the construction set forth, and the invention embraces such changes, modifications and equivalents of the parts and their formation and arrangement as come within the purview of the appended claims.

I claim:

1. A load applying unit in a hardness testing machine of the type having a frame and a power beam, said unit comprising a knob supported on said housing, a lowering screw threadedly engaged in said knob, a coupling element secured to the lower end of said screw, and a plate member having a lost motion connection with said coupling element at one end of said plate member, said plate member having means at the other end for attaching a load thereto, the plate member also having an aperture through which extends a portion of the power beam, the aperture being larger than the cross-section of said portion of the power beam to permit relative motion of the power beam when the load applying unit is in inoperative position, said plate member adapted to be moved by the lowering screw to an operative position wherein the plate member is released from the coupling element and rests on the power beam to permit the load to be applied thereto.

2. A load applying unit in a hardness testing machine of the type having a frame and a power beam, said unit comprising a knob supported on said housing, a lowering screw threadedly engaged in said knob, a coupling element secured to the lowering screw, a pin carried on said coupling element, and a plate member releasably supported on said pin at one end of said plate member, said plate member having means at the other end for attaching a load thereto, the plate member also having an aperture through which extends a portion of the power beam, the aperture being larger than the cross-section of said portion of the power beam to permit relative motion of the power beam when the load applying unit is in inoperative position, said plate member adapted to be moved by the lowering screw to an operative position wherein the plate member is released from the pin and rests on the power beam to permit the load to be applied thereto.

3. A load applying unit in a hardness testing machine of the type having a frame and a power beam, said unit comprising a knob supported on said housing, a lowering screw threadedly engaged in said knob, means preventing rotation of said lowering screw, a coupling element secured to the lower end of the lowering screw, a pin rigid with and projecting laterally from said element, and a plate member releasably supported on said pin at one end of said plate member, said plate member having means at the other end for attaching a load thereto, the plate member also having an aperture through which extends a portion of the power beam, the aperture being larger than the cross-section of said portion of the power beam to permit relative motion of the power beam when the load applying unit is in inoperative position, said plate member adapted to be moved by the lowering screw to an operative position wherein the plate member is released from the pin and rests on the power beam to permit the load to be applied thereto.

4. A load applying unit in a hardness testing machine of the type having a frame and a power beam, said unit comprising a knob supported on said housing, a lowering screw threadedly engaged in said knob, a coupling element secured to the lowering screw, a plate member releasably associated with said coupling element at one end of said plate member, said plate member having means at the other end for attaching a load thereto, the plate member also having an aperture through which extends a portion of the power beam, the aperture being larger than the cross-section of said portion of the power beam to permit relative motion of the power beam when the load applying unit is in inoperative position, said plate member adapted to be moved by the lowering screw to an operative position wherein the plate member is released from the coupling element and rests on the power beam to permit the load to be applied thereto, and resilient means adapted to prevent movement of said coupling element with respect to the frame when the load applying unit is in the operative position.

5. A load applying unit in a hardness testing machine of the type having a frame and a power beam, said unit including a screw member, means for raising and lowering said screw member with respect to said frame, a coupling element secured to the lower end of said screw member, a plate member having means for attaching a load thereto, a lost motion connection between said plate member and said power beam so that said plate member may be caused to rest on said power beam in an operative position by lowering said screw member, and a lost motion connection between said coupling element and said plate member so that the plate member may be detached from said coupling element, allowing all the weight of the load to be applied to the power beam through the plate member.

6. In a hardness tester of the type having a frame and a power beam, a load applying unit mounted on said frame and adapted to apply a load to said power beam, a coil spring secured at one end thereof to said load applying unit, a block slidably mounted in said frame, the other end of said coil spring being attached to said block, and an eccentric member on said frame connected with said block so that said block may be moved to either one of two positions to increase or decrease the tension of the coil spring a predetermined amount.

7. In a hardness tester of the type having a frame and a power beam, a load applying unit mounted on said frame and adapted to apply a load to said power beam, a coil spring secured at one end thereof to said load applying unit, a cylindrical block slidably mounted in said frame, said block having a depression in the cylindrical surface thereof, means securing the other end of said coil spring to said block, and an eccentric member mounted on said frame transversely of said block, said eccentric member extending into the depression in said block, whereby the block may be moved to either one of two positions in said frame to increase or decrease the tension in the spring a predetermined amount.

8. In a hardness testing machine, a frame, a power beam pivotally connected to said frame, a load applying unit, and a loading spring connected at one end to said frame, said unit comprising a coupling element mounted for vertical slidable movement with respect to said frame and said power beam, a plate member depending from said coupling element and supporting the other end of said spring, a lost motion connection between said plate member and said power beam so that said plate member may be caused to rest on said power beam in an operative position by lowering said coupling element, and a lost motion connection between said coupling element and said plate member so that the plate member may be detached from said coupling element, allowing all the weight of the load spring to be applied to the power beam through the plate member.

9. In a hardness testing machine, a frame, a power beam pivotally connected to said frame, a load applying unit, and a loading spring connected at one end to said frame, said unit comprising a coupling element mounted for vertical slidable movement with respect to said frame and said power beam, a plate member depending from said coupling element and supporting the other end of said spring, a lost motion connection between said coupling element and said plate member, the plate member having an aperture through which extends a portion of the power beam, the aperture being larger than the cross-section of said portion of the power beam to permit relative motion of the power beam when the load applying unit is in inoperative position, said plate member being adapted to be moved to an operative position wherein the plate member is released from the coupling element and rests on the power beam to apply force of the load spring thereto.

References Cited in the file of this patent

UNITED STATES PATENTS

| Number | Name | Date |
|---|---|---|
| 636,389 | Pool | Nov. 7, 1899 |
| 1,218,731 | Wetzel | Mar. 13, 1917 |
| 1,843,347 | Steelsmith | Feb. 2, 1932 |
| 1,973,333 | Craemer | Sept. 11, 1934 |
| 2,147,936 | Sutton | Feb. 21, 1939 |
| 2,156,325 | Whitney | May 2, 1939 |
| 2,224,936 | Smith | Dec. 17, 1940 |
| 2,329,827 | Clark | Sept. 21, 1943 |
| 2,448,486 | Chester | Aug. 31, 1948 |
| 2,455,200 | Wallace | Nov. 30, 1948 |

FOREIGN PATENTS

| Number | Country | Date |
|---|---|---|
| 1,262 | Great Britain | May 4, 1857 |
| 568,911 | Germany | Jan. 26, 1933 |